US012666319B2

(12) United States Patent　　　　　(10) Patent No.:　　US 12,666,319 B2
Kim　　　　　　　　　　　　　　　　(45) Date of Patent:　　　Jun. 23, 2026

(54) METHOD AND APPARATUS TO OPTIMIZE CONDITIONAL PSCELL ADDITION AND CHANGE (CPAC) IN WIRELESS COMMUNICATION SYSTEM

(71) Applicant: Samsung Electronics Co., Ltd., Suwon-si (KR)

(72) Inventor: Sangbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 18/313,707

(22) Filed: May 8, 2023

(65) Prior Publication Data

US 2023/0362749 A1　　　Nov. 9, 2023

(30) Foreign Application Priority Data

May 9, 2022　　(KR) ........................ 10-2022-0056475

(51) Int. Cl.
　H04W 36/00　　　　(2009.01)
　H04W 36/24　　　　(2009.01)

(52) U.S. Cl.
　CPC ...　H04W 36/0069 (2018.08); H04W 36/0058
　　　　(2018.08); H04W 36/249 (2023.05)

(58) Field of Classification Search
　CPC ......... H04W 36/0069; H04W 36/0058; H04W
　　　　　　36/249; H04W 8/24; H04W 36/0077;
　　　　　　H04W 76/15; H04W 36/362; H04W
　　　　　　36/0079; H04W 36/0085; H04W 36/02;
　　　　　　　　　　　　　　　　　H04W 36/24
　See application file for complete search history.

(56) References Cited

U.S. PATENT DOCUMENTS

| | | | |
|---|---|---|---|
| 2021/0099926 A1* | 4/2021 | Chen ................... | H04W 36/362 |
| 2024/0015610 A1* | 1/2024 | Fang ................... | H04W 36/362 |
| 2024/0099926 A1* | 3/2024 | Carlucci ................ | A61H 23/02 |
| 2024/0205763 A1* | 6/2024 | Yan ........................ | H04W 36/08 |
| 2024/0306048 A1* | 9/2024 | Wang ............... | H04W 36/0061 |
| 2024/0334291 A1* | 10/2024 | Chandrashekar ........................... |
| | | | H04W 36/00692 |
| 2025/0106753 A1* | 3/2025 | Chang ................... | H04W 48/08 |
| 2025/0184836 A1* | 6/2025 | Wu ..................... | H04W 36/305 |
| 2025/0193760 A1* | 6/2025 | Yan ................. | H04W 36/00222 |

(Continued)

FOREIGN PATENT DOCUMENTS

| | | |
|---|---|---|
| KR | 10-2022-0102921 A | 7/2022 |
| WO | 2021-109394 A1 | 6/2021 |

OTHER PUBLICATIONS

Nokia et al., Corrections to 37.340 for deactivated SCG handling, R2-2205245, 3GPP TSG-RAN WG2 Meeting #118-e, Apr. 25, 2022.

(Continued)

*Primary Examiner* — Steven Hieu D Nguyen
(74) *Attorney, Agent, or Firm* — Jefferson IP Law, LLP

(57)　　　　　　　ABSTRACT

The disclosure relates to a fifth generation (5G) or sixth generation (6G) communication system for supporting higher data rates. A method for optimizing conditional primary secondary cell (PSCell) addition/change (CPAC) in a communication system and an apparatus capable of performing the same are provided. The method includes a method for reporting successfully completed (C)PAC-related information and CPAC failure-related information.

18 Claims, 12 Drawing Sheets

(56) References Cited

U.S. PATENT DOCUMENTS

2025/0220521 A1* 7/2025 Gürsu ................ H04W 36/362
2025/0280345 A1* 9/2025 Jiang .................... H04W 36/30

OTHER PUBLICATIONS

CATT, Summary of [Post113-e][234][eDCCA] CPAC procedures (CATT), R2-2103109, 3GPP TSG RAN WG2 Meeting #113bis-e, Apr. 8, 2021.
Qualcomm Incorporated, CPAC procedures from network perspective, R2-2105260, 3GPP TSG-RAN WG2 Meeting #114-e, May 11, 2021.
Lenovo et al., 'Discussion on CPAC with deactivated SCG', R2-2202578, 3GPP TSG-RAN WG2 Meeting #117-e, Feb. 14, 2022.
International Search Report dated Jul. 26, 2023, issued in International Patent Application No. PCT/KR2023/006155.

* cited by examiner

FIG. 1E

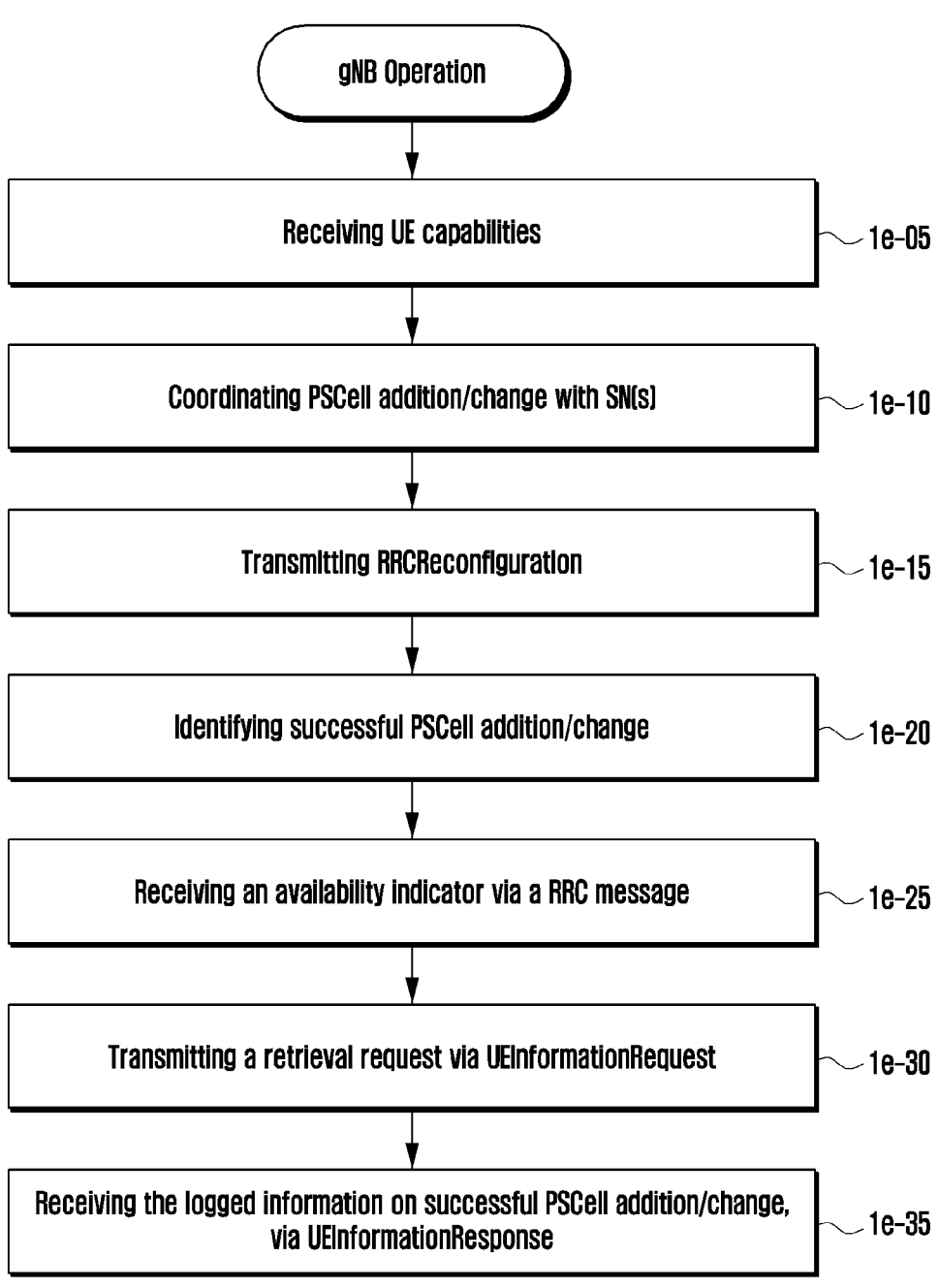

gNB Operation

Receiving UE capabilities     ⌐1e-05

Coordinating PSCell addition/change with SN(s)     ⌐1e-10

Transmitting RRCReconfiguration     ⌐1e-15

Identifying successful PSCell addition/change     ⌐1e-20

Receiving an availability indicator via a RRC message     ⌐1e-25

Transmitting a retrieval request via UEInformationRequest     ⌐1e-30

Receiving the logged information on successful PSCell addition/change, via UEInformationResponse     ⌐1e-35

FIG. 1L

METHOD AND APPARATUS TO OPTIMIZE CONDITIONAL PSCELL ADDITION AND CHANGE (CPAC) IN WIRELESS COMMUNICATION SYSTEM

CROSS-REFERENCE TO RELATED APPLICATION(S)

This application is based on and claims priority under 35 U.S.C. § 119(a) of a Korean patent application number 10-2022-0056475, filed on May 9, 2022, in the Korean Intellectual Property Office, the disclosure of which is incorporated by reference herein in its entirety.

BACKGROUND

1. Field

The disclosure relates to the operation of a user equipment and a base station in a mobile communication system. More particularly, the disclosure relates to a method for optimizing conditional primary secondary cell (PSCell) addition and change (CPAC) in a communication system and an apparatus capable of performing the method.

2. Description of Related Art

Fifth generation (5G) mobile communication technologies define broad frequency bands such that high transmission rates and new services are possible, and can be implemented not only in "Sub 6 gigahertz (GHz)" bands, such as 3.5 GHz, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz bands (for example, 95 GHz to 3 terahertz (THz) bands) in order to accomplish transmission rates fifty times faster than 5G mobile communication technologies and ultra-low latencies one-tenth of 5G.

In the initial stage of 5G mobile communication technologies, in order to support services and to satisfy performance requirements in connection with enhanced mobile broadband, (eMBB), ultra reliable & low latency communications (URLLC), and massive machine-type communications (mMTC), there has been ongoing standardization regarding beamforming and massive multiple-input multiple-output (MIMO) for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods, such as a low density parity check (LDPC) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies, such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for securing coverage in an area in which communication with terrestrial networks is impossible, and positioning.

Moreover, there has been ongoing standardization in wireless interface architecture/protocol fields regarding technologies, such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random-access channel (RACH) for NR). There also has been ongoing standardization in system architecture/service fields regarding a 5G baseline architecture (for example, service based architecture or service based interface) for combining network functions virtualization (NFV) and software-defined networking (SDN) technologies, and mobile edge computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), and the like (XR=AR+VR+mixed reality (MR)), 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for securing coverage in terahertz bands of 6G mobile communication technologies, full dimensional MIMO (FD-MIMO), multi-antenna transmission technologies, such as array antennas and large-scale antennas, meta-material-based lenses and antennas for improving coverage of terahertz band signals, high-dimensional space multiplexing technology using OAM orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Recently, a method of triggering a conditional PSCell addition or PSCell change operation in $3^{rd}$ generation partnership project (3GPP) communication technology is being studied. For example, if configured conditions are satisfied, a PSCell addition (PA) or PSCell change (PC) operation is performed. These are called conditional PSCell addition (CPA) and conditional PSCell change (CPC), respectively, and both of them are collectively called conditional PSCell addition and change (CPAC).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an improved procedure for the above-described conditional PSCell addition (CPA), conditional PSCell change (CPC), and conditional PSCell addition and change (CPAC).

Another aspect of the disclosure is to provide a method and an apparatus for reporting on successful CAP or CPC when the CPA or CPC is successfully performed.

Additional aspects will be set forth in part in the description which follows and, in part, will be apparent from the description, or may be learned by practice of the presented embodiments.

In accordance with an aspect of the disclosure, a method performed by a user equipment (UE) supporting a dual connectivity in a wireless communication system is provided. The method includes receiving, from a first base station associated with a master cell group (MCG), a radio resource control (RRC) message including first configuration information on primary secondary cell (PSCell) change associated with a secondary cell group (SCG) and second configuration information on a successful PSCell change report (SPR), performing the PSCell change based on the first configuration information, identifying whether the PScell change satisfies at least one condition for triggering SPR based on the second configuration information, and transmitting, to the first base station, the SPR in case that the at least one condition for triggering SPR is satisfied.

In accordance with another aspect of the disclosure, a method performed by a first base station associated with a master cell group (MCG) in a wireless communication system is provided. The method includes obtaining a radio resource control (RRC) message including first configuration information on primary secondary cell (PSCell) change associated with a secondary cell group (SGC) and second configuration information on a successful PSCell change report (SPR), transmitting, to a user equipment (UE), the RRC message including the first configuration information and the second configuration information, and receiving, from the UE, a SPR in case that at least one condition for triggering SPR is satisfied.

In accordance with another aspect of the disclosure, a user equipment (UE) supporting a dual connectivity in a wireless communication system is provided. The UE includes a transceiver configured to transmit and receive signals, and at least one processor coupled with the transceiver and configured to receive, from a first base station associated with a master cell group (MCG), a radio resource control (RRC) message including first configuration information on primary secondary cell (PSCell) change associated with a secondary cell group (SCG) and second configuration information on a successful PSCell change report (SPR), perform the PSCell change based on the first configuration information, identify whether the PScell change satisfies at least one condition for triggering SPR based on the second configuration information, and transmit, to the first base station, the SPR in case that the at least one condition for triggering SPR is satisfied.

In accordance with another aspect of the disclosure, a first base station associated with a master cell group (MCG) in a wireless communication system is provided. The first base station includes a transceiver configured to transmit and receive signals, and at least one processor coupled with the transceiver and configured to obtain a radio resource control (RRC) message including first configuration information on primary secondary cell (PSCell) change associated with a secondary cell group (SGC) and second configuration information on a successful PSCell change report (SPR), transmit, to a user equipment (UE), the RRC message including the first configuration information and the second configuration information, and receive, from the UE, a SPR in case that at least one condition for triggering SPR is satisfied.

According to the disclosure, a user equipment of a wireless communication system may report CPAC-related information.

More specifically, a user equipment may report successfully completed CPAC-related information and CPAC failure-related information to a base station in a wireless communication system, and thus the base station may recognize information about successfully completed CPAC. In addition, the base station may use the completed CPAC-related information and CPAC failure-related information to determine optimal parameter configuration values for wireless communication with the user equipment.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1E is a flowchart illustrating a base station operation of reporting information related to successfully completed (conditional) PSCell addition and change according to an embodiment of the disclosure;

FIG. 1L is a block diagram illustrating the structure of a base station according to an embodiment of the disclosure.

Throughout the drawings, it should be noted that like reference numbers are used to depict the same or similar elements, features, and structures.

DETAILED DESCRIPTION

Figure 1A:
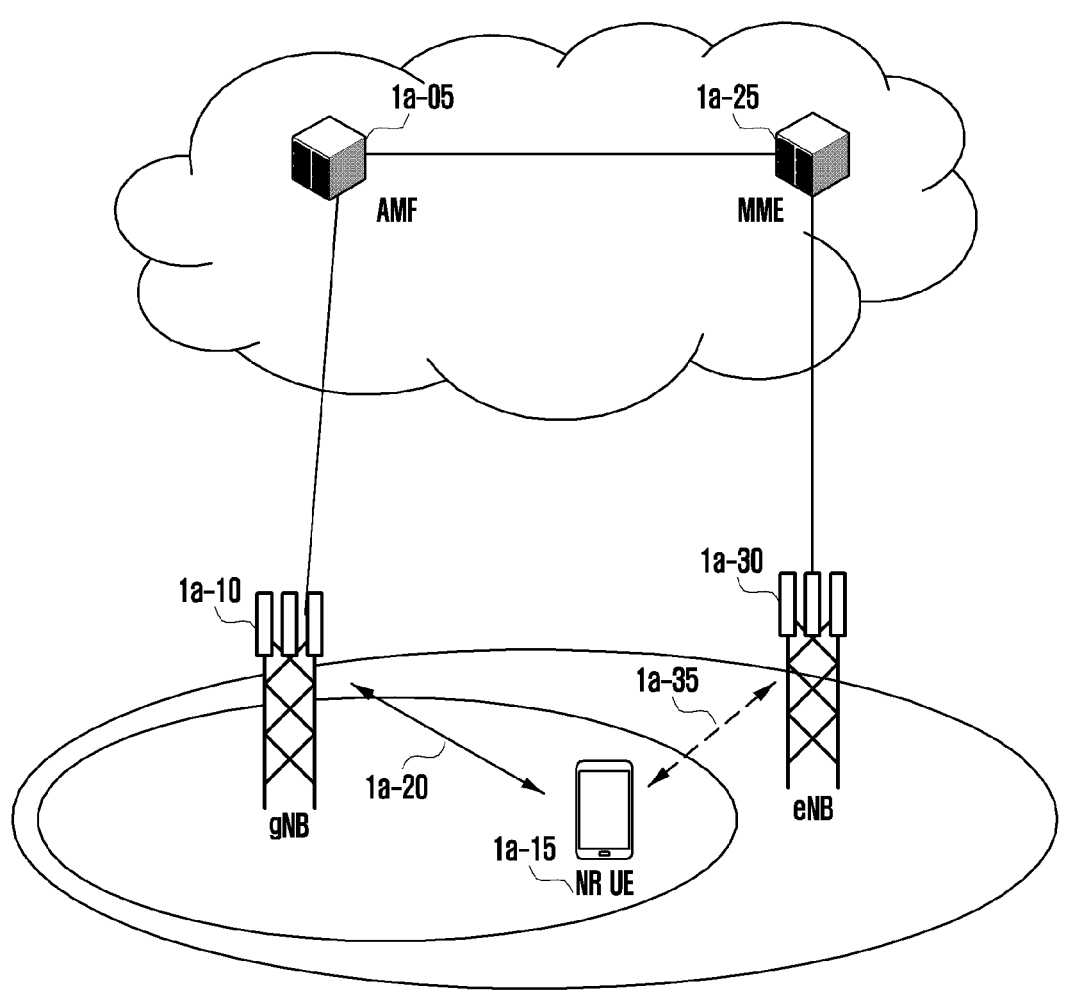
FIG. 1A is a diagram illustrating a structure of a next-generation mobile communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card.

In the following description of the disclosure, a detailed description of known functions or configurations incorporated herein will be omitted when it is determined that the description may make the subject matter of the disclosure unnecessarily unclear. Hereinafter, embodiments of the disclosure will be described with reference to the accompanying drawings.

FIG. 1A is a diagram illustrating the structure of a next-generation mobile communication system according to an embodiment of the disclosure.

Referring to FIG. 1A, a radio access network of a next-generation mobile communication system (new radio, NR)

includes a next-generation base station (new radio node B, hereinafter gNB) 1a-10 and an access and mobility management function (AMF) 1a-05 (new radio core network) as shown. A user equipment (new radio user equipment, hereinafter NR UE or user equipment) 1a-15 accesses an external network through the gNB 1a-10 and the AMF 1a-05.

Referring to FIG. 1A, the gNB corresponds to an evolved Node B (eNB) in an existing long-term evolution (LTE) system. The gNB may be connected to the NR UE through a radio channel and may provide superior service than the existing Node B (1a-20). Since all user traffic is serviced through a shared channel in the next-generation mobile communication system, a device is required to perform scheduling by collecting status information, such as buffer status of UEs, available transmission power status, channel status, and the like, and the gNB 1a-10 serves to do that. One gNB usually controls multiple cells. In order to implement high-speed data transmission compared to existing LTE, it may have the existing maximum bandwidth or more, and beamforming technology may be further applied by employing, as a radio access technology, orthogonal frequency division multiplexing (hereinafter referred to as OFDM). In addition, an adaptive modulation & coding (hereinafter referred to as AMC) method for determining a modulation scheme and a channel coding rate depending on the channel status of the user equipment is applied.

The AMF 1a-05 performs functions, such as mobility support, bearer configuration, quality of service (QoS) configuration, and the like. The AMF is a device that performs various control functions as well as mobility management functions for user equipments and is connected to multiple base stations. In addition, the next-generation mobile communication system may interwork with the existing LTE system, and the AMF is connected to the mobility management entity (MME) 1a-25 through a network interface. The MME is connected to eNB 1a-30 that is an existing base station.

The user equipment supporting LTE-NR dual connectivity (EN-DC) may transmit and receive data while maintaining connections with the eNB as well as the gNB (1a-35).

Figure 1B:
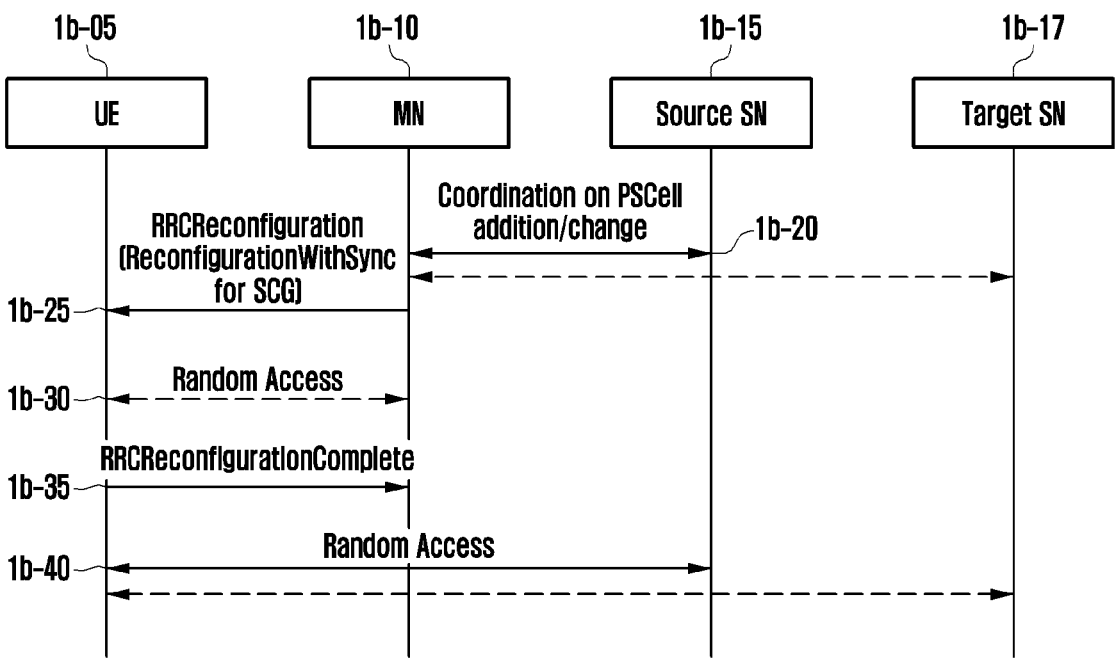
FIG. 1B is a flowchart illustrating a (conditional) PSCell addition and change process according to an embodiment of the disclosure.

FIG. 1B is a flowchart illustrating a (conditional) PSCell addition and change process according to an embodiment of the disclosure.

Referring to FIG. 1B, in order to increase the maximum data rate of a user equipment in a mobile communication system, such as long-term evolution (LTE) or new radio (NR), dual connectivity (DC) technology for simultaneously transmitting and receiving data to and from two base stations may be configured for the user equipment.

A master node (MN) 1b-10 indicates a base station providing primary cell (PCell), and a secondary node (SN) 1b-15 indicates a base station providing PSCell. The PCell is a reference cell of a master cell group (MCG) that provides a physical uplink control channel (PUCCH) and determines mobility, and the PSCell also provides a PUCCH and is a reference cell of a secondary cell group (SCG). The MCG denotes a set of serving cells provided by the MN, and the SCG denotes a set of serving cells provided by the SN. Therefore, the PCell and the PSCell must be configured in the MCG and the SCG, respectively.

Configuring the SCG for the user equipment is performed through a PSCell addition (PA) operation. In addition, the PSCell may be changed, which is performed through a PSCell change (PC) operation. The Rel-17 NR has introduced a method of triggering the PSCell addition or PSCell change operation, based on conditions. For example, if the configured conditions are satisfied, the PA or PC operation is performed. These are called conditional PSCell addition (CPA) and conditional PSCell change (CPC), respectively, and both of them are collectively called conditional PSCell addition and change (CPAC).

In order to configure (C)PAC, in operation 1b-20, the MN 1b-10 needs coordination on configuration with a predetermined SN (source SN and/or target SN) 1b-17 (1b-20). For example, in the case of (C)PC, coordination with a target SN 1b-17 is required. Coordination indicates an operation of exchanging information for configuring related configuration information together with a request for the operation.

After completing coordination, in operation 1b-25, the MN 1b-10 transmits an RRCReconfiguration message including ReconfigurationWithSync information element (IE) to the user equipment 1b-05 (1b-25). ReconfigurationWithSyncSCG IE includes configuration information required to perform PAC. In the case of CPAC, ConditionalReconfiguration IE, instead of ReconfigurationWithSync IE, is included in the RRCReconfiguration message. Up to two conditions may be configured for CPAC, and the conditions are as follows.

CondEvent A3: Conditional reconfiguration candidate becomes amount of offset better than PCell/PSCell CondEvent A4: Conditional reconfiguration candidate becomes better than absolute threshold CondEvent A5: PCell/PSCell becomes worse than absolute threshold1 and conditional reconfiguration candidate becomes better than another absolute threshold2

If two conditions are configured, the user equipment performs the CPAC operation only when both of the configured conditions are satisfied.

The user equipment drives a predetermined timer T304 when receiving an RRCReconfiguration message including ReconfigurationWithSyncSCG IE in case of PAC and when the configured conditions are satisfied in case of CPAC. If the (C)PAC operation is not successfully completed until the timer expires, the user equipment regards it as (C)PAC failure. If random access to the SN is successfully completed, the (C)PAC operation is considered to be successfully completed, and the user equipment terminates the timer T304.

In operation 1b-30, if reconfiguration with the MN 1b-10 is also required for the (C)PAC operation, a random access operation with the MN 1b-10 may be required (1b-30).

In operation 1b-35, upon receiving the RRCReconfiguration message, the user equipment 1b-05 transmits an RRCReconfigurationComplete message to the MN 1b-10 (1b-35).

In operation 1b-40, the user equipment 1b-05 performs a random access operation to a new SN for the (C)PAC operation (1b-40).

Figure 1C:
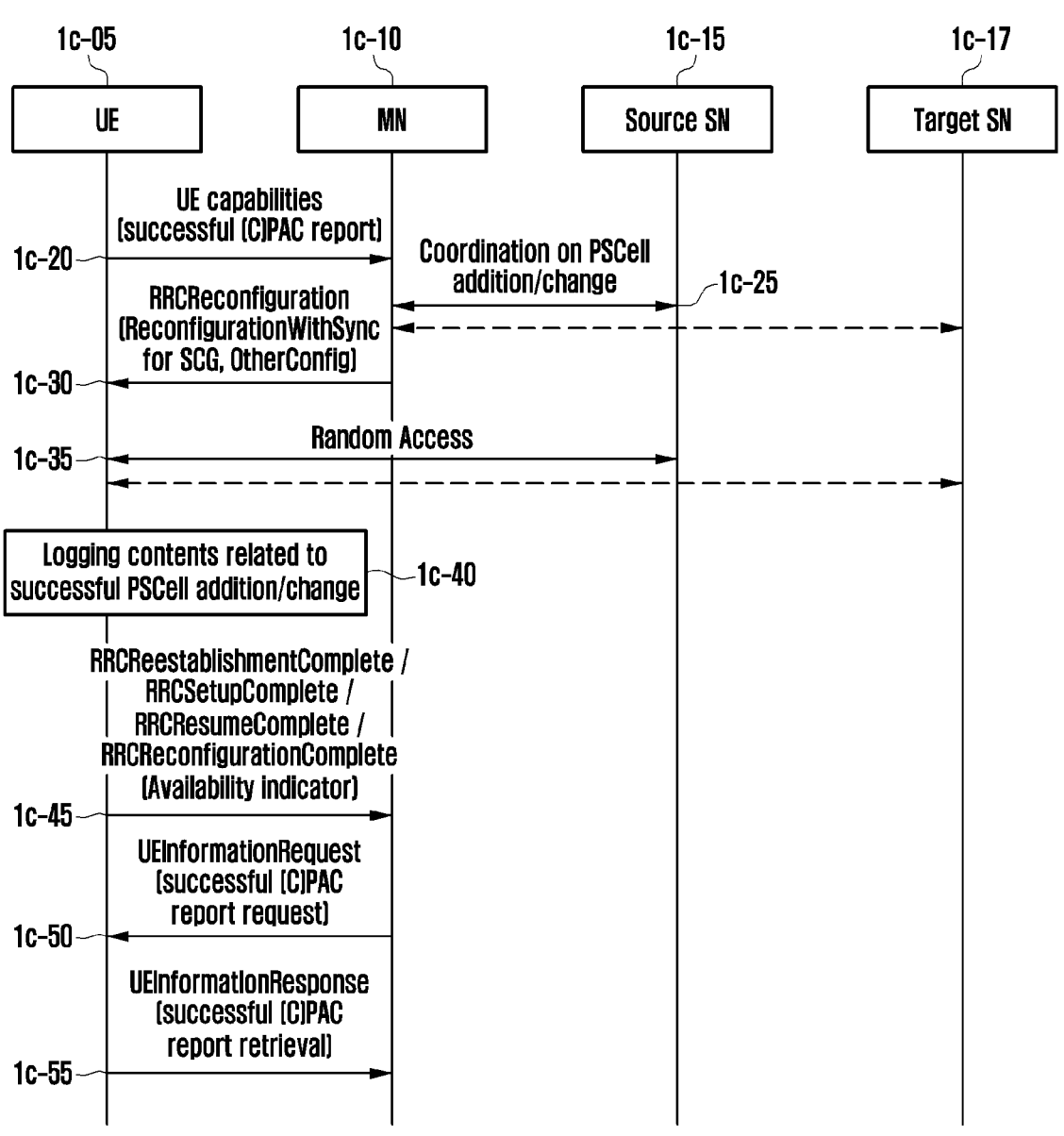
FIG. 1C is a flowchart illustrating a process of reporting information related to successfully completed (conditional) PSCell addition and change according to an embodiment of the disclosure.

FIG. 1C is a flowchart illustrating a process of reporting information related to successfully completed (conditional) PSCell addition and change according to an embodiment of the disclosure.

Referring to FIG. 1C, an embodiment of the disclosure proposes a method in which the user equipment stores and reports information about (C)PAC successfully completed. Even a successfully completed (C)PAC process may need improvement thereof. To this end, recognizing information about the successfully completed (C)PAC by the base station may be useful to find optimal parameter configuration values. In this embodiment, the report operation will be referred to as successful (C)PAC report (or SPR).

In operation 1c-20, a user equipment (UE) 1c-05 reports its own capability information to a master node (MN) 1c-10 (1c-20). The capability information may include an indicator indicating whether or not the user equipment supports successful conditional PSCell addition and change report (successful CPAC report).

In order to configure (C)PAC, in operation 1c-25, the MN needs coordination on configuration with the SN (source SN and/or target SN) 1c-17 (1c-25). At this time, coordination for configuring configuration information related to the successful CPAC report is also required.

In operation 1c-30, after completing the coordination, the MN 1c-10 transmits an RRCReconfiguration message including ReconfigurationWithSync IE (including ConditionalReconfiguration IE in the case of CPAC) and an OtherConfig IE to the user equipment 1c-05 (1c-30). ReconfigurationWithSync IE includes configuration information necessary to perform PAC. OtherConfig IE includes configuration information required to perform a successful CPAC report.

Although storing and reporting information about all successfully completed (C)PAC operations through the successful CPAC report increases user equipment complexity and signaling overhead, usefulness may not greatly be improved. It may be more sensible to trigger a successful CPAC report only for (C)PAC operations that succeeded with difficulty, instead of always triggering a successful CPAC report. Accordingly, configuration information of the successful CPAC report contained in OtherConfig IE may include information about conditions for triggering the report operation.

The above conditions may include storing and reporting information related to all successfully completed (C)PACs. In addition, a condition in which the timer T304 exceeds a specific threshold may be considered.

The network may configure the specific threshold for the user equipment. The specific threshold may be configured as a specific ratio (e.g., 20%, 40%, 60%, 80%, or the like) of the configured T304 value. If the timer T304 is driven during the (C)PAC operation and if a period of time corresponding to a specific ratio (e.g., 20%, 40%, 60%, 80%, or the like) or more elapses, the user equipment triggers successful CPAC report. For example, if the configured T304 value is 1000 ms and if the ratio is configured as 80%, the time at which the T304 value reaches 800 ms is the time of triggering successful CPAC report. Alternatively, the specific threshold may be configured as an absolute value in units of ms. In order to determine the specific threshold, the MN may need coordination with a new (or source) SN or a target SN.

In an embodiment of the disclosure, a newly added SN (or PSCell) 1c-15 determines and transmits the specific threshold to the MN 1c-10 in the case of (conditional) PSCell addition, and a target SN (or target PSCell) 1c-17 determines and transmits the specific threshold to the MN 1c-10 in the case of (conditional) PSCell change. The MN 1c-10 receiving the specific threshold includes the configuration information in OtherConfig IE and transmits the same to the user equipment 1c-05.

Additionally, other conditions below may also be considered, and if at least one of the following conditions is satisfied, the user equipment 1c-05 may trigger successful CPAC report.

Whether or not MCG failure (i.e., MN radio link failure (RLF)) occurs during the (C)PAC operation.

When a timer T310 is driven for the PCell during the (C)PAC operation and if a period of time corresponding to a specific ratio (e.g., 20%, 40%, 60%, 80%, or the like) or more elapses. In this case, the specific ratio is determined by the PCell, and the MN 1c-10 includes the specific ratio in OtherConfig IE and transmits the same to the user equipment 1c-05.

When a timer T312 is driven for the PCell during the (C)PAC operation and if a period of time corresponding to a specific ratio (e.g., 20%, 40%, 60%, 80%, or the like) or more elapses. In this case, the specific ratio is determined by the PCell, and the MN 1c-10 includes the specific ratio in OtherConfig IE and transmits the same to the user equipment 1c-05.

When a timer T310 is driven for a source PSCell during the (C)PC operation and if a period of time corresponding to a specific ratio (e.g., 20%, 40%, 60%, 80%, or the like) or more elapses. In this case, the specific ratio is determined by the source PSCell, and this configuration information is contained in OtherConfig IE via the MN and then transmitted to the user equipment.

When a timer T312 is driven for a source PSCell during the (C)PC operation and if a period of time corresponding to a specific ratio (e.g., 20%, 40%, 60%, 80%, or the like) or more elapses. In this case, the specific ratio is determined by the source PSCell, and this configuration information is contained in OtherConfig IE via the MN and then transmitted to the user equipment.

In operation 1c-35, the user equipment 1c-05 performs random access to a newly added PSCell in the case of (conditional) PSCell addition and performs random access to a target PSCell in the case of (conditional) PSCell change (1c-35).

The user equipment 1c-05 determines whether or not the configured conditions are satisfied according to the configuration information of the successful CPAC report. If the configured conditions are satisfied, the successful CPAC report is triggered.

At this time, in operation 1c-40, when the CPAC operation is successfully completed, the user equipment 1c-05 stores predetermined information related to the CPAC operation (1c-40). The predetermined information is as follows.

PCell information, that is, PCell identifier (ID) (i.e., cell global identity (CGI) or physical cell ID (PCI)), cell-level and beam-level PCell measurement results, and whether or not RLF occurs in the (C)PAC Source PSCell information, that is, source PSCell ID (i.e., CGI or PCI) and cell-level and beam-level source PSCell measurement results Target PSCell information, that is, target PSCell ID (i.e., CGI or PCI) and cell-level and beam-level target PSCell measurement results Cell-level and beam-level neighboring cell measurement results PSCell change type information, for example, MN-initiated or SN-initiated, normal or conditional, and PSCell addition or change In the case of CPAC, configured condition information, executed condition information, and a list of candidate target PSCell IDs (CGIs or PCIs)

In the case of CPAC, information on an indicator indicating whether or not a measured neighboring cell is a candidate target PSCell Time information from the time of receiving the most recent (C)PAC configuration information to the time at which the PSCell addition or change is completed In the case of CPAC, time information from the time at which CPAC is performed as the most recent conditions are satisfied to the time at which the PSCell addition or change is completed The time at which UP data transmission in the SN is paused during the CPAC operation. The time from the arrival of the last packet data convergence protocol (PDCP) protocol data unit (PDU) in the source PS Cell until the arrival of the first PDCP PDU in the target PSCell in the case of (conditional) PSCell change. The time from reception of the most recent PSCell addition configuration until the arrival of the first PDCP PDU to a new PSCell in the case of (conditional) PSCell addition Indicator information indicating whether or not inter-master node handover has occurred along with PSCell change Location information of the user equipment Information related to random access, for example, (some) information contained in the of the related art ra-InformationCommon; and Information on current registered public land mobile network (RPLMN) (or PLMN selected by a user equipment network-attached storage (NAS)). This information is used to perform PLMN checking prior to reporting the stored information to the base station.

The user equipment storing (some) information above may report content of the stored successful CPAC report to the network through a predetermined RRC process.

The user equipment may report the information to the base station through a UE information procedure. The user equipment determines whether or not PLMN information stored together with the information is the same as the RPLMN of the current user equipment. If they are the same, in operation 1c-45, the user equipment 1c-05 includes an availability indicator indicating that the user equipment 1c-05 stores content of the successful CPAC report in a predetermined RRC message, for example, RRCReestablishmentComplete, RRCSetupComplete, RRCResumeComplete, or RRCReconfigurationComplete, and transmits the same to the base station 1c-10 (1c-45). In operation 1c-50, upon receiving the indicator information, the base station 1c-10 may request a report on the information using a UEInformationRequest message (1c-50).

In operation 1c-55, upon receiving the request, the user equipment 1c-05 transmits the successful CPAC report to the base station 1c-10 using a UEInformationResponse message (1c-55).

The user equipment 1c-05 may transmit the successful CPAC report to the base station 1c-10 using a SCGFailureInformation message. Although the SCGFailureInformation message was used according to the related art to report only SCG failure-related information, it may be extended to report successfully completed CPAC-related information in the embodiment of the disclosure.

After CPAC is successfully completed, the user equipment 1c-05 may include (some) content of the successful CPAC report in the SCGFailureInformation message and transmit the same to the MN or SN. At this time, a new indicator indicating the successful CPAC report is configured in a failureType field contained in the SCGFailureInformation message.

The user equipment 1c-05 may transmit the successful CPAC report to the base station using an MCGFailureInformation message. More particularly, if the successful CPAC report is triggered due to satisfying a specific condition, the report is unable to be performed by the MCG. For example, if the successful CPAC report is triggered due to satisfying the following conditions:

whether or not MCG failure (i.e., MN RLF) occurs during the (C)PAC operation;

when a timer T310 is driven for the PCell during the (C)PAC operation and if a period of time corresponding to a specific ratio or more elapses;

when a timer T312 is driven for the PCell during the (C)PAC operation and if a period of time corresponding to a specific ratio or more elapses, the user equipment is unable to make the report to the MN. Instead, the user equipment may include (some) content of the successful CPAC report in the MCGFailureInformation message and transmit the same to the SN. At this time, a new indicator indicating the successful CPAC report is configure in a failureType field contained in the MCGFailureInformation message.

Figure 1D:
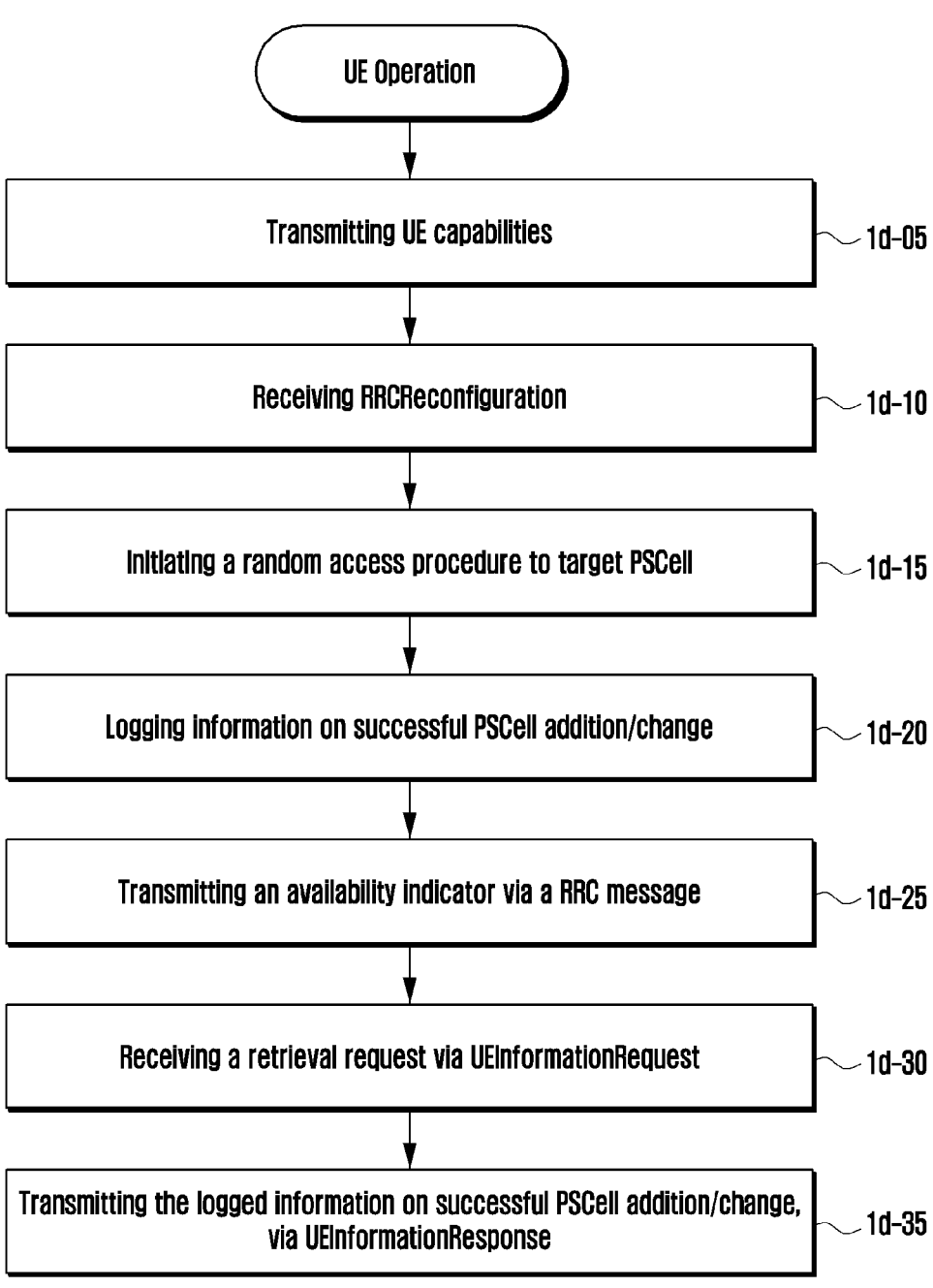
FIG. 1D is a flowchart illustrating a user equipment operation of reporting information related to successfully completed (conditional) PSCell addition and change according to an embodiment of the disclosure.

FIG. 1D is a flowchart illustrating a user equipment operation of reporting information related to successfully completed (conditional) PSCell addition and change according to an embodiment of the disclosure.

Referring to FIG. 1D, in operation 1d-05, a user equipment reports its own capability information to a master node (MN). (Transmitting UE capabilities) The capability information may include an indicator indicating whether or not the user equipment supports a successful CPAC report.

In operation 1d-10, the user equipment may receive an RRCReconfiguration message. (Receiving RRCReconfiguration) The user equipment receives an RRCReconfiguration message containing ReconfigurationWithSync IE (or ConditionalReconfiguration IE) and OtherConfig IE. ReconfigurationWithSync IE or ConditionalReconfiguration IE contains configuration information necessary to perform a CPAC operation, and OtherConfig IE contains configuration information necessary to perform a successful CPAC report operation.

In operation 1d-15, the user equipment performs a random access process to a predetermined PSCell. (Initiating a random access procedure to target PSCell)

In operation 1d-20, if at least one of conditions contained in the successful CPAC report operation configuration information is satisfied during the random access process, the user equipment stores content of the successful CPAC report. (Logging information on successful PSCell addition/change)

In operation 1d-25, the user equipment includes an availability indicator indicating that the user equipment stores the content of the successful CPAC report in a predetermined RRC message and transmits the same to the base station. (Transmitting an availability indicator via a RRC message)

In operation 1d-30, the user equipment receives a UEInformationRequest message including an indicator requesting a report on the information from the base station. (Receiving a retrieval request via UEInformationRequest)

In operation 1d-35, the user equipment transmits the successful CPAC report to the base station using a UEInformationResponse message. (Transmitting the logged information on successful PSCell addition/change, via UEInformationResponse)

FIG. 1E is a flowchart illustrating a base station operation of reporting information related to successfully completed (conditional) PSCell addition and change according to an embodiment of the disclosure.

Referring to FIG. 1E, in operation 1e-05, the base station receives, from a user equipment, capability information of the corresponding user equipment. (Receiving UE capabilities)

In operation 1e-10, the base station performs coordination with predetermined SN(s) to establish (C)PAC and successful CPAC report. (Coordinating PSCell addition/change with SN(s))

In operation 1e-15, the base station transmits an RRCReconfiguration message containing configuration information of a predetermined (C)PAC and successful CPAC report to the user equipment. (Transmitting RRCReconfiguration)

In operation 1e-20, the base station recognizes that the (C)PAC operation has been successfully completed. (Identifying successful PSCell addition/change)

In operation 1e-25, the base station receives a predetermined RRC message containing an availability indicator indicating that the content of the successful CPAC report is stored from the user equipment. (Receiving an availability indicator via a RRC message)

In operation 1e-30, the base station transmits a UEInformationRequest message including an indicator requesting a report on the information to the user equipment. (Transmitting a retrieval request via UEInformationRequest)

In operation 1e-35, the base station receives a UEInformationResponse message containing the successful CPAC report from the user equipment. (Receiving the logged information on successful PSCell addition/change, via UEInformationResponse)

Figure 1F:
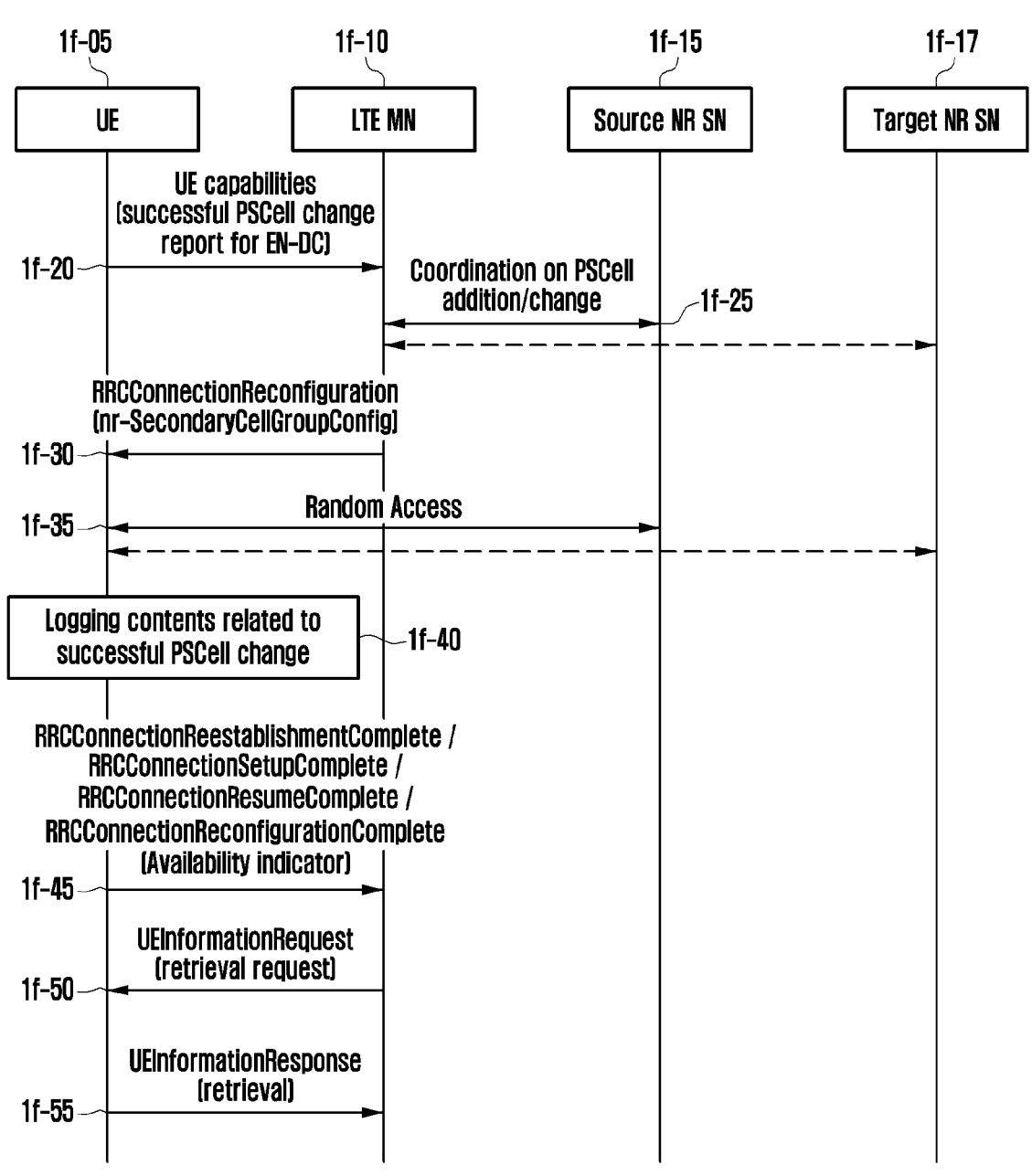
FIG. 1F is a flowchart illustrating a process of reporting information related to successfully completed (conditional) PSCell addition and change in a dual connectivity environment according to an embodiment of the disclosure.

FIG. 1F is a flowchart illustrating a process of reporting information related to successfully completed (conditional) PSCell addition and change in a dual connectivity environment according to an embodiment of the disclosure.

Referring to FIG. 1F, in order to increase the maximum data rate of a user equipment in a mobile communication system, such as long-term evolution (LTE) or new radio (NR), dual connectivity technology (DC) for simultaneously transmitting and receiving data to and from two base stations may be configured for the user equipment. In this case, the case where the MN is LTE and the SN is NR is referred to as EN-DC.

An embodiment of the disclosure proposes a method for performing (C)PAC and successful CPAC reporting in an EN-DC scenario.

In operation 1f-20, a user equipment 1f-05 reports its own capability information to an LTE MN 1f-10 (1f-20). The capability information may include an indicator indicating whether or not the user equipment 1f-05 supports a successful CPAC report in EN-DC.

In operation 1f-25, in order to configure (C)PAC, the MN 1f-10 needs coordination on configuration with a predetermined NR SN (source SN and/or target SN) 1f-17 (1f-25). At this time, coordination for configuring configuration information related to the successful CPAC report is also required.

In operation 1f-30, after completing the coordination, the MN transmits an RRCConnectionReconfiguration message including ReconfigurationWithSync IE (ConditionalReconfiguration IE in the case of CPAC) and OtherConfig IE to the user equipment (1f-30). At this time, the IEs are contained in nr-SecondaryCellGroupConfig IE of the RRCConnectionReconfiguration message. ReconfigurationWithSync IE includes configuration information necessary to perform PAC. In the case of CPAC, ConditionalReconfiguration IE, instead of ReconfigurationWithSync IE, is included in the RRCConnectionReconfiguration message. As conditions for CPAC, the following two conditions may be further considered in addition to the conditions described above.

CondEvent B1: Conditional reconfiguration candidate becomes better than absolute threshold CondEvent B2: PCell becomes worse than absolute threshold1 AND conditional reconfiguration candidate becomes better than another absolute threshold2

If two conditions are configured, the user equipment performs the CPAC operation only when both of the configured conditions are satisfied.

OtherConfig IE includes configuration information required to perform successful CPAC reporting. Although storing and reporting information about all successfully completed (C)PAC operations through the successful CPAC report increases user equipment complexity and signaling overhead, usefulness may not greatly be improved. It may be more sensible to trigger a successful CPAC report only for (C)PAC operations that succeeded with difficulty, instead of always triggering a successful CPAC report. Accordingly, configuration information of the successful CPAC report contained in OtherConfig IE may include information about conditions for triggering the report operation. The conditions have been described above.

In operation 1f-35, the user equipment 1f-05 performs random access to a newly added PSCell 1f-15 in the case of (conditional) PSCell addition and performs random access to a target PSCell 1f-17 in the case of (conditional) PSCell change (1f-35).

The user equipment 1f-05 determines whether or not the configured conditions are satisfied according to the configuration information of the successful CPAC report. If the configured conditions are satisfied, the successful CPAC report is triggered. At this time, in operation 1f-40, when the CPAC operation is successfully completed, the user equipment 1f-05 stores predetermined information related to the CPAC operation (1f-40). The predetermined information has been described above, but since serving cells belonging to MCG are LTE, beam-level measurement results are excluded.

The user equipment 1f-05 storing the (some) information may report content of the stored successful CPAC report to the network through a predetermined RRC process.

The user equipment 1f-05 may report the information to the base station through a UE Information procedure. The user equipment 1f-05 determines whether or not PLMN information stored together with the information is the same as the RPLMN of the current user equipment.

If they are the same, in operation 1f-45, the user equipment 1f-05 includes an availability indicator indicating that the user equipment stores content of the successful CPAC report in a predetermined RRC message, for example, RRCConnectionReestablishmentComplete, RRCConnectionSetupComplete, RRCConnectionResumeComplete, or RRCConnectionReconfigurationComplete, and transmits the same to the base station 1f-10 (1f-45).

In operation 1f-50, upon receiving the indicator information, the base station 1f-10 may request a report on the information using a UEInformationRequest message (1f-50).

In operation 1f-55, upon receiving the request, the user equipment 1f-05 transmits the successful CPAC report to the base station 1f-10 using a UEInformationResponse message (1f-55).

The successful CPAC report may be reported to NR cells, as well as to LTE. In this case, the successful CPAC report may be stored in one container and reported to the NR cell through a predetermined RRC message. Introduction of the container is due to the fact that the NR cell may not be able to decode the successful CPAC report because it is configured as LTE coding. The successful CPAC report received by the NR cell may need to be forwarded to the LTE cell related to the report. To this end, ID information (CGI) of the LTE PCell for which the successful CPAC report is configured may also be reported to the NR. At this time, the cell ID information is not included in the container and is configured as NR coding in order to the NR cell to interpret the same.

Figure 1G:
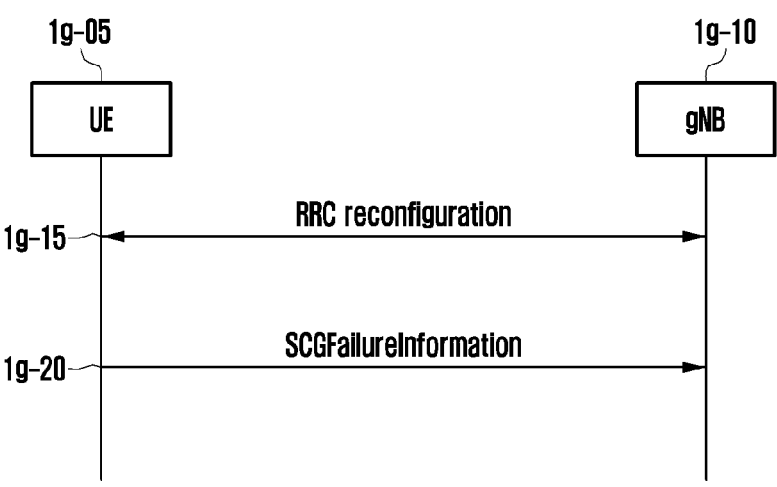
FIG. 1G is a flowchart illustrating a process of reporting SCGFailureInformation according to an embodiment of the disclosure.

FIG. 1G is a flowchart illustrating a process of reporting SCGFailureInformation according to an embodiment of the disclosure.

Referring to FIG. 1G, in operation 1g-15, a user equipment (UE) 1g-05 may transmit an RRC reconfiguration message to a base station (gNB) 1g-10. Thereafter, in operation 1g-20, the base station (gNB) 1g-10 receiving the RRC reconfiguration message may transmit an SCGFailure-Information message to a user equipment 1g-05.

The SCGFailureInformation message is used by the user equipment 1g-05 for the purpose of notifying the NR MN 1g-10 or LTE MN (in the EN-DC environment) of SCG failure. The message includes failureType information indicating the type of SCG failure, ID information of a previous PSCell and failed PSCell, cell measurement information, user equipment location information, information related to random access attempted to the PSCell, and elapsed time information after the failure until the SCGFailureInforma-tion message is transmitted.

In EN-DC, the SCGFailureInformationNR message including the content is reported to the LTE MN.

An embodiment of the disclosure proposes a method in which, when CPAC fails, a user equipment includes infor-mation related to the CPAC in the SCGFailureInformation message and reports the same to the base station.

Figure 1H:
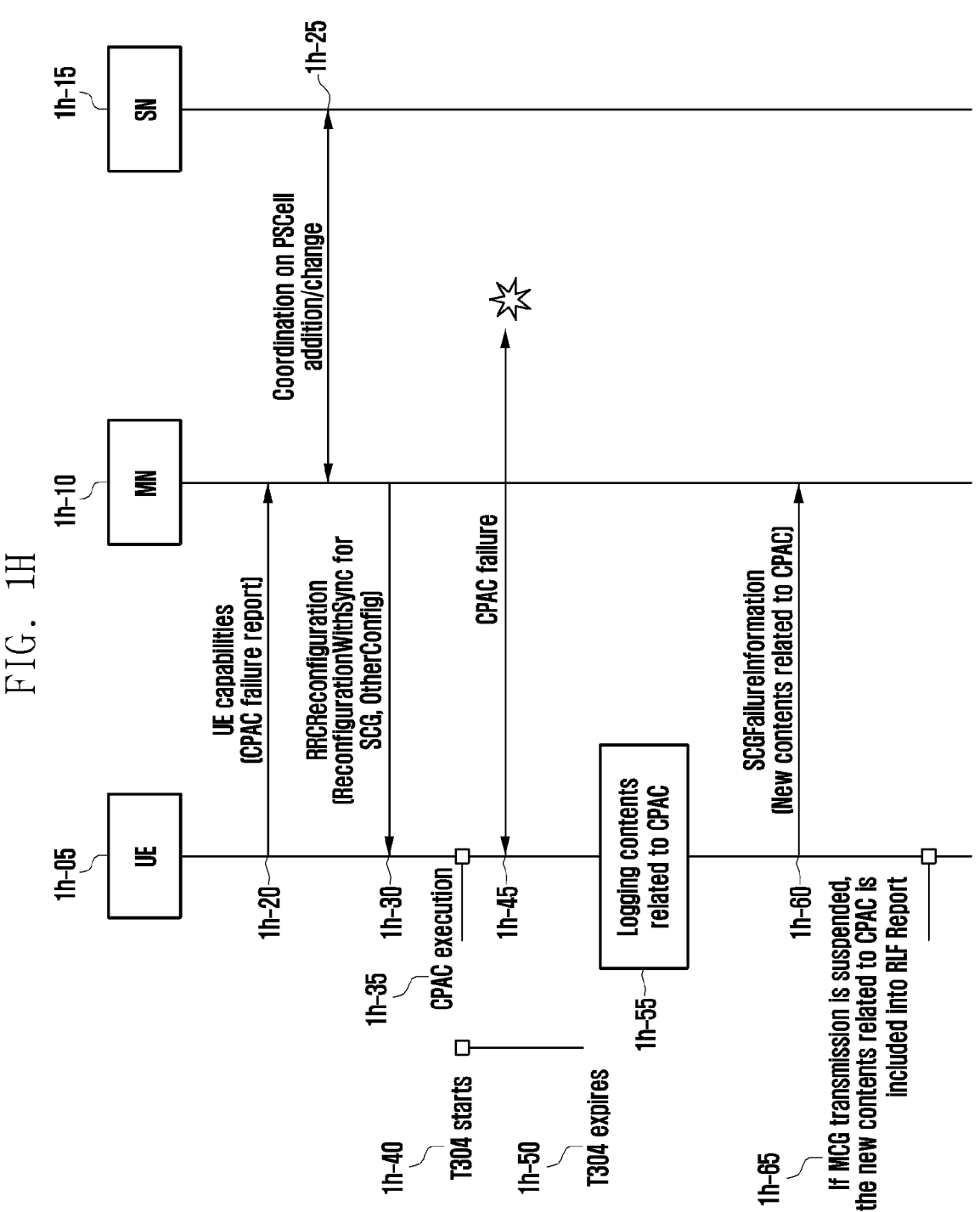
FIG. 1H is a flowchart illustrating a process of reporting information related to failure of conditional PS Cell addition and change according to an embodiment of the disclosure.

FIG. 1H is a flowchart illustrating a process of reporting information related to failure of conditional PS Cell addition and change according to an embodiment of the disclosure.

Referring to FIG. 1H, in operation 1h-20, the user equip-ment 1h-05 reports its own capability information to a master node (MN) 1h-10 (1h-20). The capability informa-tion may include an indicator indicating whether or not the user equipment 1h-05 is able to report information related to failure of conditional PSCell addition and change (CPAC).

In operation 1h-25, in order to configure CPAC, the MN 1h-10 needs coordination for configuration with an SN (source SN and/or target SN) 1h-15 (1h-25).

In operation 1h-30, after completing the coordination, the MN 1h-10 transmits an RRCReconfiguration message including ConditionalReconfiguration IE and OtherConfig IE to the user equipment 1h-05 (1h-30).

ConditionalReconfiguration IE includes configuration information necessary to perform CPAC. OtherConfig IE may include an indicator indicating the CPAC failure report. Alternatively, when the CPAC failure occurs, the user equip-ment capable of reporting CPAC failure may always have to transmit an SCGFailureInformation message containing information related to the failure.

In operation 1h-35, when conditions configured in Con-ditionalReconfiguration IE are satisfied, the user equipment 1h-05 performs a CPAC operation on a predetermined PSCell (1h-35).

At this time, in operation 1h-40, the user equipment 1h-05 drives a timer T304 (1h-40).

In operation 1h-45, the user equipment 1h-05 performs random access to a newly added PSCell in the case of conditional PSCell addition and performs random access to a target PSCell in the case of conditional PSCell change (1h-45).

In operation 1h-50, if the timer T304 expires before the random access is successfully completed (1h-50), in opera-tion 1h-55, the user equipment 1h-05 determines that the CPAC has failed and stores the following information related to the CPAC operation (1h-55). At this time, information contained in the SCGFailureInformation of the related art described above is also stored.

An indicator indicating that CPAC has failed or a new code point in the failureType field Configured condition information and executed condition information ID information (CGI or PCI) of the PCell for which the CPAC was configured, and cell-level/beam-level cell measurement results List of candidate target PSCell IDs (CGIs or PCIs), and cell-level/beam-level cell measurement results Indicator information indicating whether or not the mea-sured neighboring cell is a candidate target PSCell Time information from the time of receiving the most recent CPAC configuration information to the time at which PSCell addition or change is completed Time information from the time at which CPAC is per-formed as the most recent conditions are satisfied to the time at which the PSCell addition or change is com-pleted The time at which UP data transmission in the SN is paused. The time from the arrival of the last PDCP PDU in the source PSCell until the arrival of the first PDCP PDU in the target PSCell in the case of (condi-tional) PSCell change. The time from reception of the most recent PSCell addition configuration until the arrival of the first PDCP PDU to a new PSCell in the case of (conditional) PSCell addition An indicator indicating whether or not MCG transmission is suspended in the case of CPAC failure In operation 1h-60, the user equipment 1h-05 transmits the information to the base station 1h-10 using the SCGFail-ureInformation message (1h-60).

If MCG transmission is temporarily suspended, the SCGFailureInformation message cannot be transmitted. Therefore, in the above case, in operation 1h-65, the user equipment 1h-05 may include the (some) CPAC-related storage information in RLF Report and report the same to the base station 1h-10 (1h-65).

The base station 1h-10 receiving the information will utilize the information in order to optimize CPAC configu-ration information. For example, the base station may rec-ognize the cause of failure from the information and readjust configuration values of conditions for performing the CPAC.

Figure 1I:
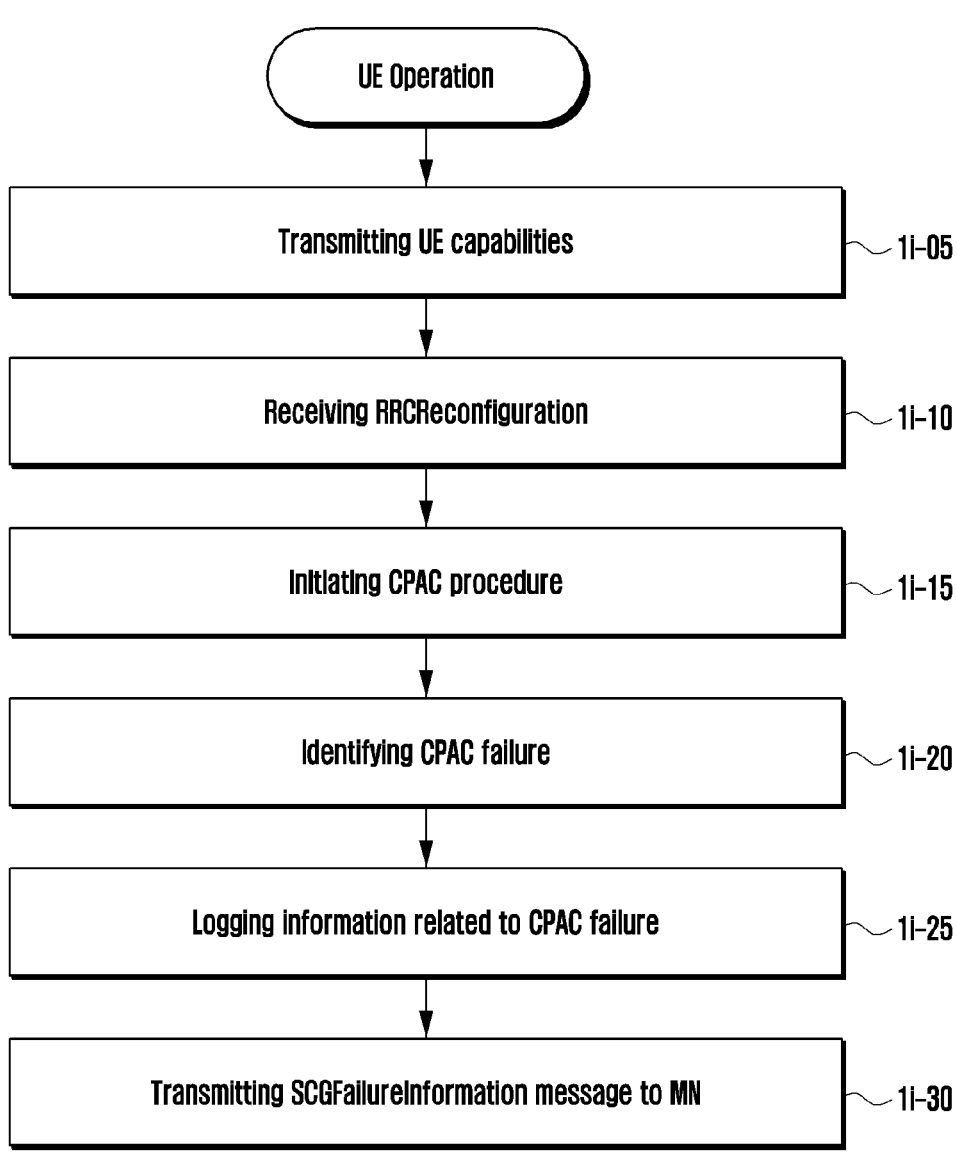
FIG. 1I is a flowchart illustrating a user equipment operation of reporting information related to failure of conditional PSCell addition and change according to an embodiment of the disclosure.

FIG. 1I is a flowchart illustrating a user equipment operation of reporting information related to failure of conditional PSCell addition and change according to an embodiment of the disclosure.

Referring to FIG. 1I, in operation 1i-05, the user equip-ment reports its own capability information to the base station. The capability information may include an indicator indicating whether or not the user equipment is able to report information related to CPAC failure. (Transmitting UE capa-bilities)

In operation 1i-10, the user equipment receives an RRCReconfiguration message containing CPAC configura-tion information. (Receiving RRCReconfiguration)

In operation 1i-15, if the configure conditions are satis-fied, the user equipment performs a CPAC operation. (Ini-tiating CPAC procedure)

In operation 1i-20, the user equipment recognizes that the CPAC operation has failed. (Identifying CPACP failure)

In operation 1i-25, the user equipment stores information related to the aforementioned CPAC. (Logging information related to CPAC failure)

In operation 1*i*-30, the user equipment transmits SCGFailureInformation containing information related to the CPAC. (Transmitting SCGFailureInformation message to MN)

Figure 1J:
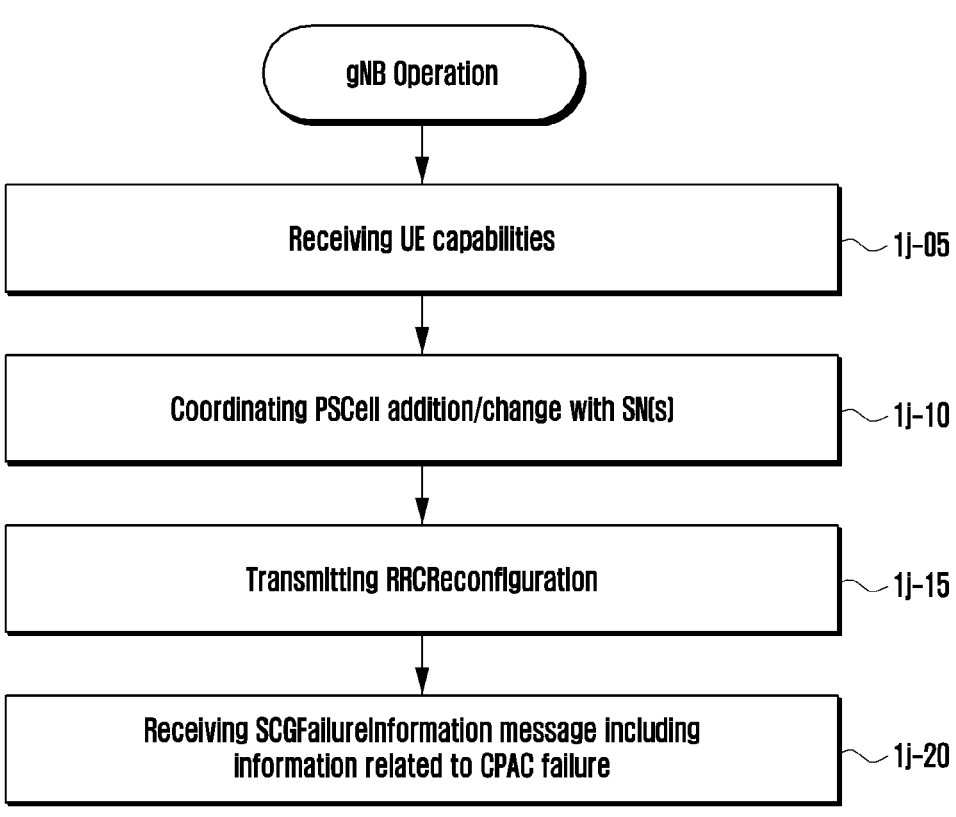
FIG. 1J is a flowchart illustrating a base station operation of reporting information related to failure of conditional PSCell addition and change according to an embodiment of the disclosure.

FIG. 1J is a flowchart illustrating a base station operation of reporting information related to failure of conditional PSCell addition and change according to an embodiment of the disclosure.

Referring to FIG. 1J, in operation 1*j*-05, the base station receives user equipment capability information from the user equipment. (Receiving UE capabilities)

In operation 1*j*-10, the base station performs coordination with predetermined PCells to perform CPAC. (Coordinating PSCell addition/change with SN(s))

In operation 1*j*-15, the base station transmits an RRCReconfiguration message containing CPAC configuration information to the user equipment. (Transmitting RRCReconfiguration)

In operation 1*j*-20, the base station receives an SCGFailureInformation message containing information related to the CPAC failure from the user equipment. (Receiving SCGFailureInformation message including information related to CPAC failure)

Figure 1K:
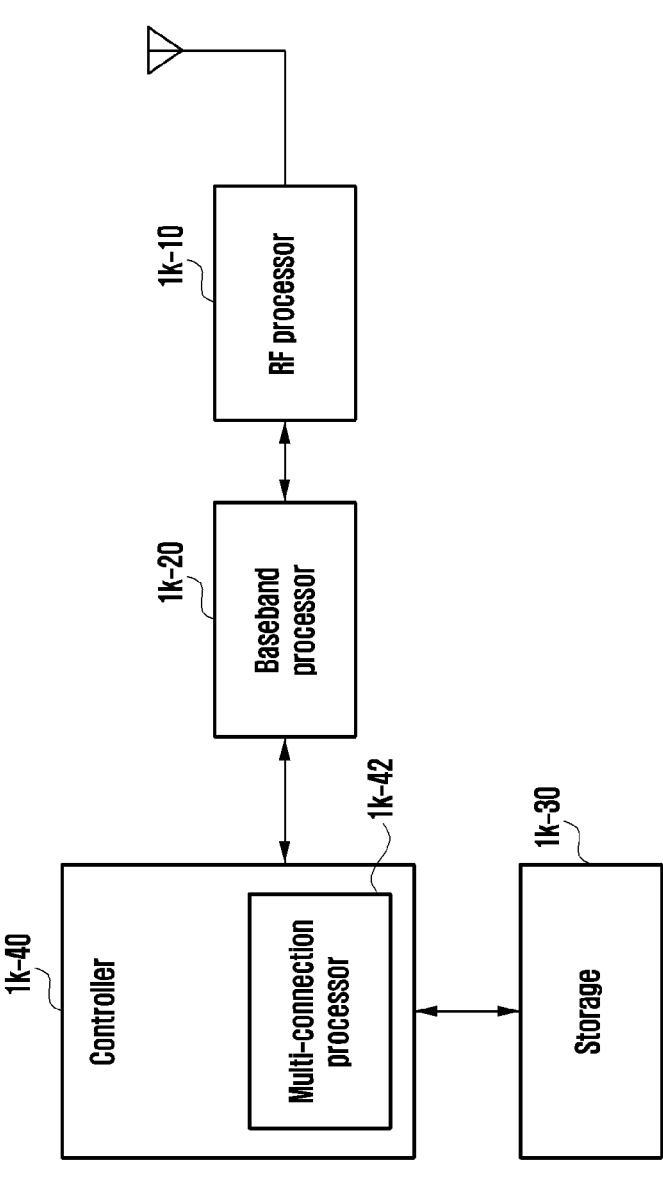
FIG. 1K is a block diagram illustrating an internal structure of a user equipment according to an embodiment of the disclosure.

FIG. 1K is a block diagram illustrating an internal structure of a user equipment according to an embodiment of the disclosure.

Referring to FIG. 1K, the user equipment includes a radio frequency (RF) processor 1*k*-10, a baseband processor 1*k*-20, a storage 1*k*-30, a controller 1*k*-40, and a multi-connection processor 1*k*-42.

The RF processor 1*k*-10 performs a function for transmitting and receiving a signal through a wireless channel, such as band conversion and amplification of a signal. For example, the RF processor 1*k*-10 up-converts a baseband signal provided from the baseband processor 1*k*-20 into an RF band signal, transmits the same through an antenna, and down-converts an RF band signal received through the antenna into a baseband signal. For example, the RF processor 1*k*-10 may include a transmission filter, a reception filter, an amplifier, a mixer, an oscillator, a digital-to-analog converter (DAC), an analog-to-digital converter (ADC), and the like. Although only one antenna is shown in the drawing, the user equipment may include multiple antennas. In addition, the RF processor 1*k*-10 may include a plurality of RF chains. Furthermore, the RF processor 1*k*-10 may perform beamforming. For the beamforming, the RF processor 1*k*-10 may adjust the phase and size of each of signals transmitted and received through multiple antennas or antenna elements. In addition, the RF processor may perform MIMO and receive multiple layers when performing a MIMO operation.

The baseband processor 1*k*-20 performs a conversion function between a baseband signal and a bit stream according to the physical layer standard of a system. For example, when transmitting data, the baseband processor 1*k*-20 generates complex symbols by encoding and modulating a transmission bit stream. In addition, when receiving data, the baseband processor 1*k*-20 demodulates and decodes a baseband signal provided from the RF processor 1*k*-10, thereby restoring a received bit stream. For example, in the case of orthogonal frequency division multiplexing (OFDM), when transmitting data, the baseband processor 1*k*-20 encodes and modulates a transmission bit stream to generate complex symbols and configures OFDM symbols through an inverse fast Fourier transform (IFFT) operation and cyclic prefix (CP) insertion after mapping the complex symbols to subcarriers. In addition, when receiving data, the baseband processor 1*k*-20 divides a baseband signal provided from the RF processor 1*k*-10 into OFDM symbol units, restores the signals mapped to subcarriers through a fast Fourier transform (FFT) operation, and then restores a received bit stream through demodulation and decoding.

The baseband processor 1*k*-20 and the RF processor 1*k*-10 transmit and receive signals as described above. Accordingly, the baseband processor 1*k*-20 and the RF processor 1*k*-10 may be referred to as a transmitter, a receiver, a transceiver, or a communication unit. Furthermore, at least one of the baseband processor 1*k*-20 and the RF processor 1*k*-10 may include a plurality of communication modules to support a plurality of different wireless access technologies. In addition, at least one of the baseband processor 1*k*-20 and the RF processor 1*k*-10 may include different communication modules to process signals in different frequency bands. For example, the different wireless access technologies may include a wireless local area network (LAN) (e.g., institute of electrical and electronics engineers (IEEE) 802.11), a cellular network (e.g., LTE), and the like. In addition, the different frequency bands may include a super high frequency (SHF) (e.g., 2.NRHz or NRhz) band and a millimeter (mm) wave (e.g., 60 GHz) band.

The storage 1*k*-30 stores basic programs for operating the user equipment, application programs, and data, such as configuration information and the like. More particularly, the storage 1*k*-30 may store information related to a second access node performing wireless communication using a second wireless access technology. In addition, the storage 1*k*-30 provides the stored data according to a request from the controller 1*k*-40.

The controller 1*k*-40 controls overall operations of the user equipment. For example, the controller 1*k*-40 transmits and receives signals through the baseband processor 1*k*-20 and the RF processor 1*k*-10. In addition, the controller 1*k*-40 writes and reads data to and from the storage 1*k*-30. To this end, the controller 1*k*-40 may include at least one processor. For example, the controller 1*k*-40 may include a communication processor (CP) that performs communication control and an application processor (AP) that controls upper layers, such as application programs.

Figure 1L:
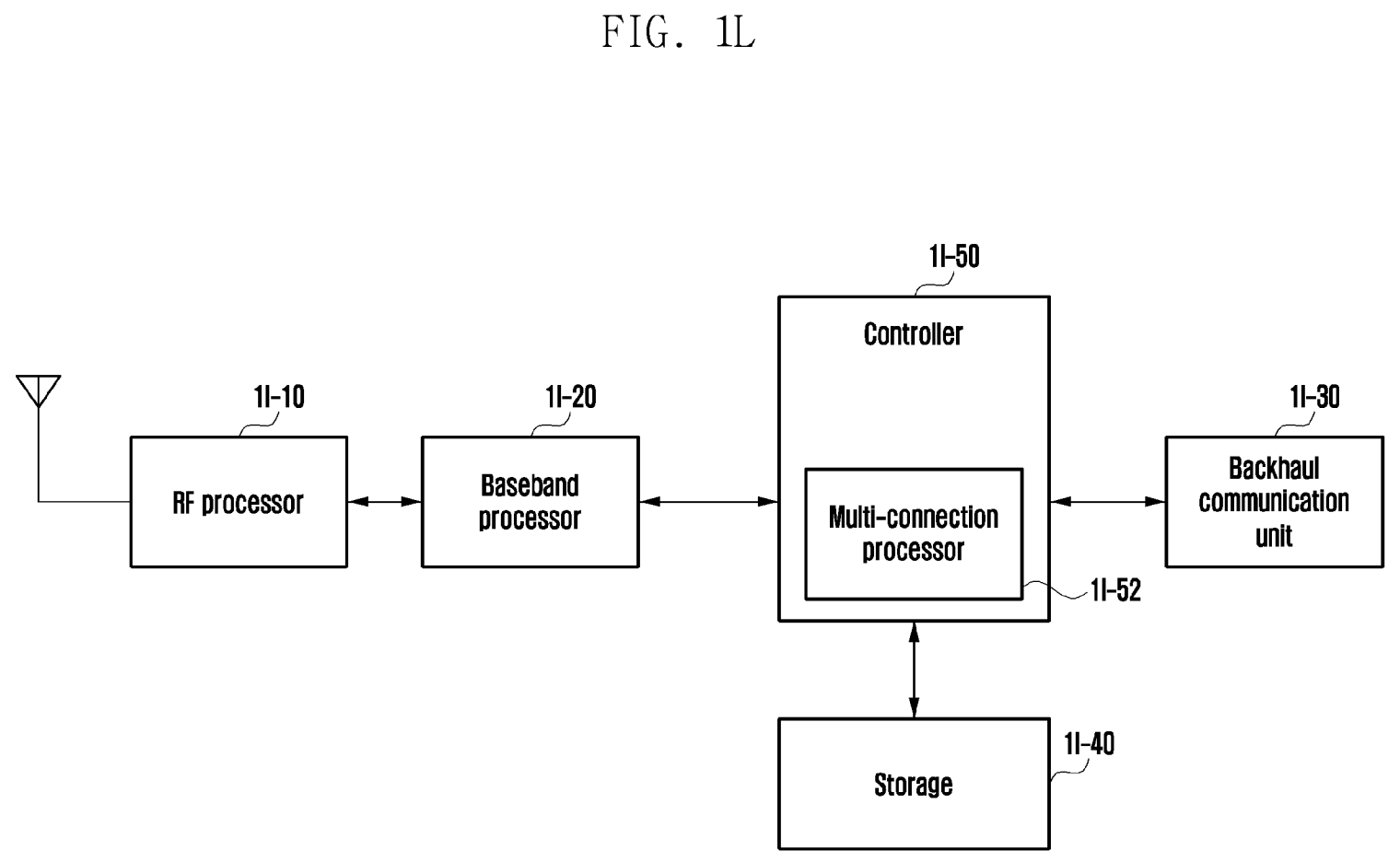

FIG. 1L is a block diagram illustrating a structure of a base station according to an embodiment of the disclosure.

Referring to FIG. 1L, the base station is configured to include an RF processor 1*l*-10, a baseband processor 1*l*-20, a backhaul communication unit 1*l*-30, a storage 1*l*-40, a controller 1*l*-50, and a multi-connection processor 1*l*-52.

The RF processor 1*l*-10 performs a function for transmitting and receiving a signal through a wireless channel, such as band conversion and amplification of a signal. For example, the RF processor 1*l*-10 up-converts a baseband signal provided from the baseband processor 1*l*-20 into an RF band signal, transmits the same through an antenna, and down-converts an RF band signal received through the antenna into a baseband signal. For example, the RF processor 1*l*-10 may include a transmission filter, a reception filter, an amplifier, a mixer, an oscillator, a DAC, an ADC, and the like. Although only one antenna is shown in the drawing, the first connection mode may include multiple antennas. In addition, the RF processor 1*l*-10 may include a plurality of RF chains. Furthermore, the RF processor 1*l*-10 may perform beamforming. For the beamforming, the RF processor 1*l*-10 may adjust the phase and size of each of signals transmitted and received through multiple antennas or antenna elements. In addition, the RF processor may perform a downlink MIMO operation by transmitting one or more layers.

The baseband processor 1*l*-20 performs a conversion function between a baseband signal and a bit stream according to the physical layer standard of a first wireless connection technology. For example, when transmitting data, the baseband processor 1*l*-20 generates complex symbols by encoding and modulating a transmission bit stream. In addition, when receiving data, the baseband processor 1*l*-20 demodulates and decodes a baseband signal provided from the RF processor 1*l*-10, thereby restoring a received bit stream. For example, in the case of OFDM, when transmitting data, the baseband processor 1*l*-20 encodes and modulates a transmission bit stream to generate complex symbols and configures OFDM symbols through an IFFT operation and CP insertion after mapping the complex symbols to subcarriers. In addition, when receiving data, the baseband processor 1*l*-20 divides a baseband signal provided from the RF processor 1*l*-10 into OFDM symbol units, restores the signals mapped to subcarriers through an FFT operation, and then restores a received bit stream through demodulation and decoding. The baseband processor 1*l*-20 and the RF processor 1*l*-10 transmit and receive signals as described above. Accordingly, the baseband processor 1*l*-20 and the RF processor 1*l*-10 may be referred to as a transmitter, a receiver, a transceiver, a communication unit, or a wireless communication unit.

The backhaul communication unit 1*l*-30 provides an interface for communicating with other nodes in the network. For example, the backhaul communication unit 1*l*-30 converts a bit stream, transmitted from a primary base station to another node, for example, a secondary base station, a core network, or the like, into a physical signal and converts a physical signal received from other nodes into bit streams.

The storage 1*l*-40 stores basic programs for the operation of the primary base station, application programs, and data, such as configuration information and the like. More particularly, the storage 1*l*-40 may store information on bearers assigned to connected user equipments, measurement results reported from connected user equipments, and the like. In addition, the storage 1*l*-40 may store information that is a criterion for determining whether to provide or stop multiple connections to a user equipment. In addition, the storage 1*l*-40 provides the stored data according to a request from the controller 1*l*-50.

The controller 1*l*-50 controls overall operations of the primary base station. For example, the controller 1*l*-50 transmits and receives signals through the baseband processor 1*l*-20 and the RF processor 1*l*-10 or through the backhaul communication unit 1*l*-30. In addition, the controller 1*l*-50 writes and reads data to and from the storage 1*l*-40. To this end, the controller 1*l*-50 may include at least one processor.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) supporting a dual connectivity in a wireless communication system, the method comprising:

receiving, from a base station, a radio resource control (RRC) message including configuration information for reporting a successful primary secondary cell (PS-Cell) change;

performing a random access procedure to a PSCell of a secondary cell group (SCG);

based on the configuration information for reporting the successful PSCell change, storing successful PSCell change information, wherein the successful PSCell change information includes public land mobile network (PLMN) information and includes information indicating whether the successful PSCell change is initiated by a secondary node (SN);

identifying whether the UE has the stored successful PSCell change information and a registered PLMN (RPLMN) is included in the PLMN information stored in the successful PSCell change information;

in case that the UE has the stored successful PSCell change information and the RPLMN is included in the PLMN information stored in the successful PSCell change information, transmitting, to the base station, an RRC complete message including a first indicator indicating an availability of the successful PSCell change information;

receiving, from the base station, a UE information request message including a second indicator indicating the UE to report the successful PSCell change information; and transmitting, to the base station, a UE information response message including the successful PSCell change information.

2. The method of claim 1, wherein the configuration information for reporting the successful PSCell change includes at least one of first threshold information for a ratio in percentage between an elapsed timer T304 and a configured value of a timer T304, second threshold information for a ratio in percentage between an elapsed timer T310 and a configured value of a timer T310, or third threshold information for a ratio in percentage between an elapsed timer T312 and a configured value of a timer T312, wherein the first threshold information is associated with a target PSCell, wherein the second threshold information is associated with a source PSCell, and wherein the third threshold information is associated with the source PSCell.

3. The method of claim 2, wherein the UE stores the successful PSCell change information, in case that a ratio between a value of an elapsed time of the timer T304 and the configured value of the timer T304 is greater than the first threshold information, or in case that a ratio between a value of an elapsed time of the timer T310 and the configured value of the timer T310 is greater than the second threshold information, or in case that a ratio between a value of an elapsed time of the timer T312 and the configured value of the timer T312 is greater than the third threshold information.

4. The method of claim 1, wherein the successful PSCell change information includes at least one of first information on a primary cell (PCell) identifier (ID), second information on a source PSCell ID, third information on a target PSCell, fourth information on a measurement result of neighboring cells, fifth information on a time associated with a conditional reconfiguration execution and a reception of the latest conditional reconfiguration, sixth information on a location, or seventh information on a random access (RA).

5. The method of claim 1, further comprising:

transmitting, to the base station, UE capability information including a third indicator indicating that the UE supports reporting the successful PSCell change information.

6. A method performed by a base station supporting a dual connectivity in a wireless communication system, the method comprising:

transmitting, to a user equipment (UE), a radio resource control (RRC) message including configuration information for reporting a successful primary secondary cell (PSCell) change;

receiving, from the UE, an RRC complete message including a first indicator indicating an availability of successful PSCell change information, in case that the successful PSCell change information is stored and a registered public land mobile network (RPLMN) is included in public land mobile network (PLMN) information stored in the successful PSCell change information;

transmitting, to the UE, a UE information request message including a second indicator indicating the UE to report the successful PSCell change information; and receiving, from the UE, a UE information response message including the successful PSCell change information, wherein the successful PSCell change information includes PLMN information and includes information indicating whether the successful PSCell change is initiated by a secondary node (SN), and wherein the configuration information is associated with the successful PSCell change information.

7. The method of claim 6, wherein the configuration information for reporting the successful PSCell change includes at least one of first threshold information for a ratio in percentage between an elapsed timer T304 and a configured value of a timer T304, second threshold information for a ratio in percentage between an elapsed timer T310 and a configured value of a timer T310, or third threshold information for a ratio in percentage between an elapsed timer T312 and a configured value of a timer T312, wherein the first threshold information is associated with a target PSCell, wherein the second threshold information is associated with a source PSCell, and wherein the third threshold information is associated with the source PSCell.

8. The method of claim 6, wherein the successful PSCell change information includes at least one of first information on a primary cell (PCell) identifier (ID), second information on a source PSCell ID, third information on a target PSCell, fourth information on a measurement result of neighboring cells, fifth information on a time associated with a conditional reconfiguration execution and a reception of the latest conditional reconfiguration, sixth information on a location, or seventh information on a random access (RA).

9. The method of claim 6, further comprising:

receiving, from the UE, UE capability information including a third indicator indicating that the UE supports reporting the successful PSCell change information.

10. A user equipment (UE) supporting a dual connectivity in a wireless communication system, the UE comprising:

a transceiver; and a controller coupled with the transceiver, and configured to:

receive, from a base station, a radio resource control (RRC) message including configuration information for reporting a successful primary secondary cell (PSCell) change, perform a random access procedure to a PSCell of a secondary cell group (SCG), based on the configuration information for reporting the successful PSCell change, store successful PSCell change information, wherein the successful PSCell change information includes public land mobile network (PLMN) information and includes information indicating whether the successful PSCell change is initiated by a secondary node (SN), identify whether the UE has the stored successful PSCell change information and a registered PLMN (RPLMN) is included in the PLMN information stored in the successful PSCell change information, in case that the UE has the stored successful PSCell change information and the RPLMN is included in the PLMN information stored in the successful PSCell change information, transmit, to the base station, an RRC complete message including a first indicator indicating an availability of the successful PSCell change information, receive, from the base station, a UE information request message including a second indicator indicating the UE to report the successful PSCell change information, and transmit, to the base station, a UE information response message including the successful PSCell change information.

11. The UE of claim 10, wherein the configuration information for reporting the successful PSCell change includes at least one of first threshold information for a ratio in percentage between an elapsed timer T304 and a configured value of a timer T304, second threshold information for a ratio in percentage between an elapsed timer T310 and a configured value of a timer T310, or third threshold information for a ratio in percentage between an elapsed timer T312 and configured value of a timer T312, wherein the first threshold information is associated with a target PSCell, wherein the second threshold information is associated with a source PSCell, and wherein the third threshold information is associated with the source PSCell.

12. The UE of claim 11, wherein the UE stores the successful PSCell change information, in case that a ratio between a value of an elapsed time of the timer T304 and the configured value of the timer T304 is greater than the first threshold information; or in case that a ratio between a value of an elapsed time of the timer T310 and the configured value of the timer T310 is greater than the second threshold information; or in case that a ratio between a value of an elapsed time of the timer T312 and the configured value of the timer T312 is greater than the third threshold information.

13. The UE of claim 10, wherein the successful PSCell change information includes at least one of first information on a primary cell (PCell) identifier (ID), second information on a source PSCell ID, third information on a target PSCell, fourth information on a measurement result of neighboring cells, fifth information on a time associated with a conditional reconfiguration execution and a reception of the latest conditional reconfiguration, sixth information on a location, or seventh information on a random access (RA).

14. The UE of claim 10, wherein the controller is further configured to:

transmit, to the base station, UE capability information including a third indicator indicating that the UE supports reporting the successful PSCell change information.

15. A base station supporting a dual connectivity in a wireless communication system, the base station comprising:

a transceiver; and a controller coupled with the transceiver, and configured to:

transmit, to a user equipment (UE), a radio resource control (RRC) message including configuration information for reporting a successful primary secondary cell (PSCell) change, receive, from the UE, an RRC complete message including a first indicator indicating an availability of successful PSCell change information, in case that the successful PSCell change information is stored and a registered public land mobile network (RPLMN) is included in public land mobile network (PLMN) information stored in the successful PSCell change information, transmit, to the UE, a UE information request message including a second indicator indicating the UE to report the successful PSCell change information, and receive, from the UE, a UE information response message including the successful PSCell change information, wherein the successful PSCell change information includes PLMN information and includes information indicating whether the successful PSCell change is initiated by a secondary node (SN), and wherein the configuration information is associated with the successful PSCell change information.

16. The base station of claim 15, wherein the configuration information for reporting the successful PSCell change includes at least one of first threshold information for a ratio in percentage between an elapsed timer T304 and a configured value of a timer T304, second threshold information for a ratio in percentage between an elapsed timer T310 and a configured value of a timer T310, or third threshold information for a ratio in percentage between an elapsed timer T312 and a configured value of a timer T312, wherein the first threshold information is associated with a target PSCell, wherein the second threshold information is associated with a source PSCell, and wherein the third threshold information is associated with the source PSCell.

17. The base station of claim 15, wherein the successful PSCell change information includes at least one of first information on a primary cell (PCell) identifier (ID), second information on a source PSCell ID, third information on a target PSCell, fourth information on a measurement result of neighboring cells, fifth information on a time associated with a conditional reconfiguration execution and a reception of the latest conditional reconfiguration, sixth information on a location, or seventh information on a random access (RA).

18. The base station of claim 15, wherein the controller is further configured to:

receive, from the UE, UE capability information including a third indicator indicating that the UE supports reporting the successful PSCell change information.

\* \* \* \* \*